United States Patent [19]
Bercz et al.

[11] 3,708,903
[45] Jan. 9, 1973

[54] SELF-ILLUMINATING CHEMILUMINESCENT FISHING LURE

[75] Inventors: Christa V. Bercz, Oaklyn; Jolan S. Rozmanith, Cherry Hill; Jeno P. Bercz, Oaklyn, all of N.J.

[73] Assignee: Lurex, Inc., Cherry Hill, N.J.

[22] Filed: Feb. 12, 1971

[21] Appl. No.: 114,979

[52] U.S. Cl. ..............43/17.6, 43/42.06, 43/42.09, 43/42.33, 43/42.35, 43/42.38, 43/42.43, 43/42.46
[51] Int. Cl. ...........................................A01k 85/00
[58] Field of Search........43/17.6, 17.5, 42.06, 42.33, 43/42.35

[56] References Cited

UNITED STATES PATENTS

| | | |
|---|---|---|
| 336,953 | 3/1886 | Scotland et al........................43/17.6 |
| 1,380,876 | 6/1921 | Warden...............................43/17.6 |
| 1,422,841 | 7/1922 | Dey......................................43/17.6 |
| 2,420,286 | 5/1947 | Lacey et al........................252/188.3 |
| 3,178,848 | 4/1965 | Lane.................................43/42.06 |
| 3,309,811 | 3/1967 | Wimer...............................43/42.06 |

Primary Examiner—Aldrich F. Medbery
Assistant Examiner—George M. Yahwak
Attorney—Woodcock, Washburn, Kurtz & Mackiewicz

[57] ABSTRACT

A self-illuminating fishing lure container having a cavity receiving chemiluminescent material and comprising a gas permeable member impervious to the chemiluminescent material for reducing pressure build-up within the cavity by gas diffusion. The gas permeable member may comprise a material softer than the adjacent members of the lure and may be held in place by a snap-action mechanism or clamped in place. The member which communicates with the exterior of the lure permits the escape of gases common to that of normal atmosphere while preventing pollution of environmental waters by the chemiluminescent material(s). At least a portion of the container may comprise a transparent material with preferred embodiments including an optical brightener.

18 Claims, 16 Drawing Figures

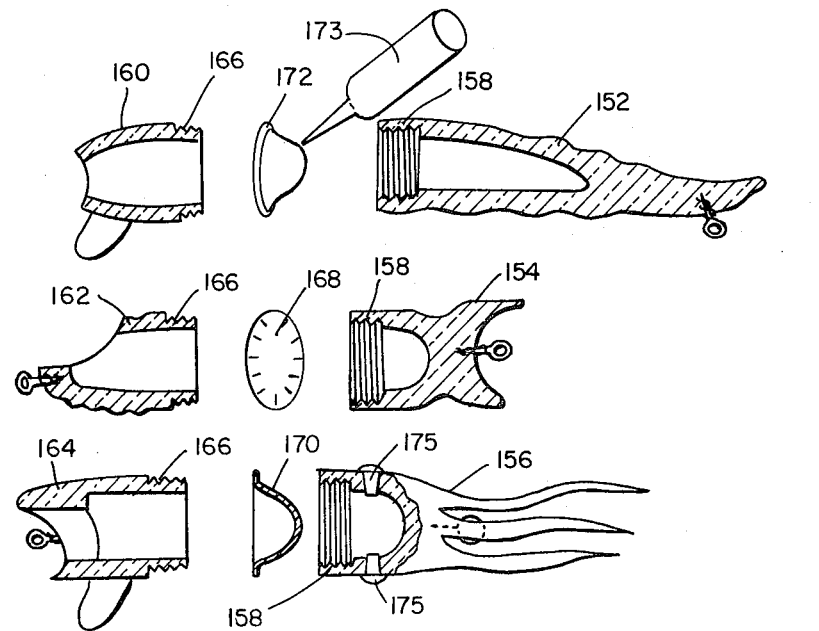
Fig. 12
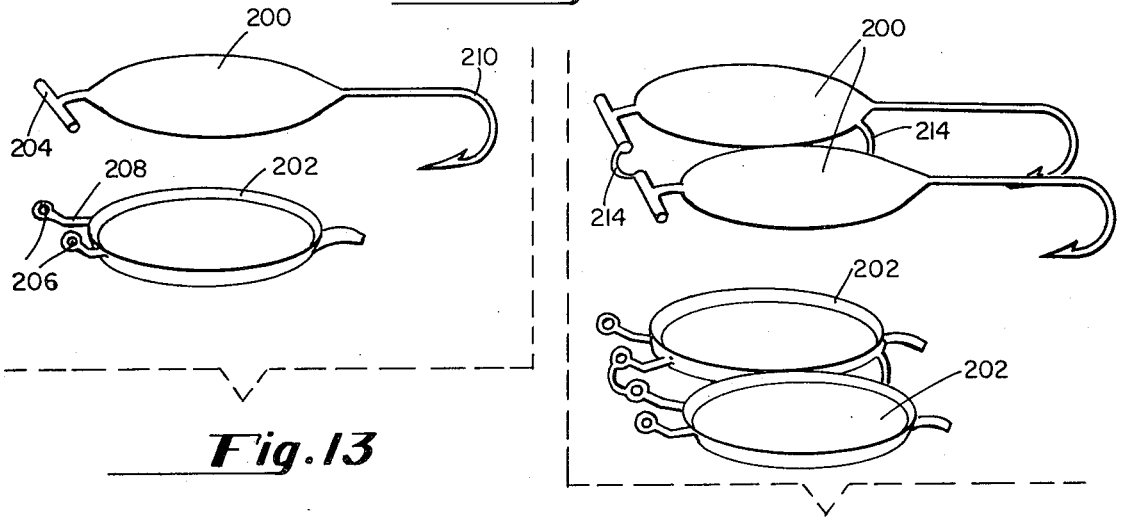
Fig. 13
Fig. 14
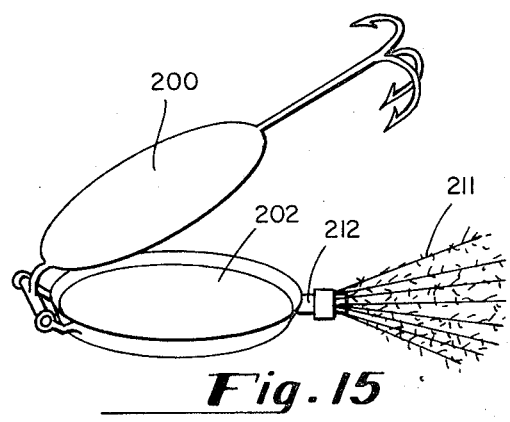
Fig. 15
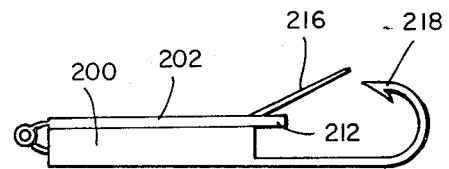
Fig. 16

SELF-ILLUMINATING CHEMILUMINESCENT FISHING LURE

BACKGROUND OF THE INVENTION

This invention relates to self-illuminating fishing lures comprising transparent material and having a cavity which may be filled and refilled with chemiluminescent materials for generating light emission.

It is generally known by fishermen and verified in scientific experiments, that aquatic animals, especially fish are attracted by light. Several self-illuminating lures are known in the prior art, which generate low intensity light or light for short periods of time. These rely on a variety of principles such as the interaction of mercury vapors with red phosphorous in vacuum, or the interaction of mercury vapors with a noble gas in vacuum but raise the danger of mercury pollution.

For practical field applications, it is advantageous to provide sport fishermen with self-illuminating lures which can generate light of higher intensity for long periods while still permitting reactivation or reuse of such a lure in order to reduce the cost to the user. As described in copending application Ser. No. 114,968, filed Feb. 12, 1971, now abandoned, by applicants herein and incorporated herein by reference, improved chemiluminescent compositions based on materials such as luminol present in an advantageous matrix generate chemiluminescent light of higher intensity for prolonged periods in a continuous and/or pulsating manner when exposed to an aqueous solution of peroxyradicals in the presence of hydroxyl ions and a catalyst.

In addition to the desired light, the chemiluminescent reaction produces gaseous side products such as oxygen and nitrogen. These gases when enclosed within a container such as those disclosed in copending application build up pressure which can rupture a weak container or may force liquid contents out of the container and pollute the water surrounding the lure. This is particularly true, if strong shaking of the container is required for very high light intensity output activation. It is of course undesirable to permit pollution of the environmental waters surrounding the fishing lure by the escape of chemiluminescent materials from within the lure.

SUMMARY OF THE INVENTION

In accordance with one important aspect of the invention, a reusable pollution free self-illuminating fishing lure is provided comprising a container having a cavity serving as a chemiluminescent reaction chamber.

In accordance with another important aspect of the invention, the container comprises a gas permeable means impervious to the chemiluminescent material which is associated with the reaction chamber so as to permit the escape of gases from the reaction chamber while preventing the escape of the chemiluminescent material.

In accordance with a further aspect of the invention, the container comprises a body member cooperating with a gas permeable member impervious to water and chemiluminescent materials which serves as a lid enclosing the cavity. Snap-acting connecting means are provided on the body member and the gas permeable member to permit the container to be opened and closed for refilling of the cavity with chemiluminescent materials. The body member may comprise a hard, plastic transparent material having means for attaching a lure or hook to a container while the gas permeable lid comprises a softer weaker material.

By providing a variation in thickness for the gas permeable lid, preferably thicker adjacent to the edge than at the center, two very important functions are provided. First, diffusion is facilitated by providing areas of reduced thickness. Second, where the variation in thickness creates a concave surface with respect to the interior of the cavity, increased pressure within the cavity may force the rim of the gas permeable lid against a suitable lip on the body member to create a pollution-free pressure resistant seal between the gas permeable member and the body even when the container is shaken. By also providing extensions having holes therein which extend from the body member, the container can serve as a hook equipped fishing tackle or a fishing tackle can be attached to the container or one container may be attached to another.

In accordance with a still further aspect of the invention, the gas permeable member is clamped between two threadedly engaged body members. The gas permeable member which comprises a membrane thickened at the edges provides a good seal when the body members are threadedly engaged. At least one of the body members may include openings to permit the filling and refilling of the cavity without disengaging the body members. These openings may be closed by suitable closure means in the form of plugs.

In accordance with still another aspect of the invention, a fishing lure kit is provided having components permitting fishermen to design and assemble their own lures. The fishermen may then open the lure, introduce a luminescent material into the cavity and then close the lure. In further accordance with this aspect, it comprises interchangable lure body members and interchangable membranes, lids, and/or sealing members to permit the assembly of various lures utilizing different combinations of the elements in the kit.

BRIEF DESCRIPTION OF THE DRAWINGS

FIG. 12 are sectional views of various interchangable components of a fishing lure kit; and FIGS. 13–16 are views of still other fishing lure embodiments of the invention characterized by hinged container lids.

DETAILED DESCRIPTION OF PREFERRED EMBODIMENTS

Figure 1:
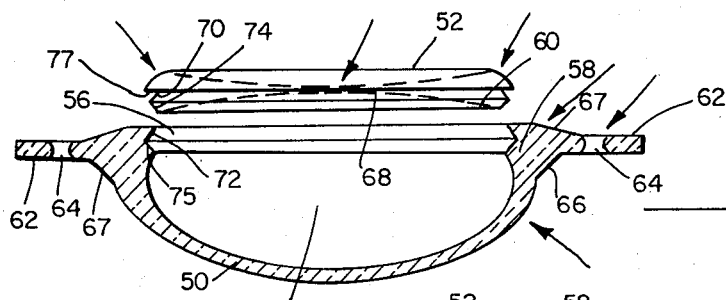
FIG. 1 is an exploded sectional view of a fishing lure embodying the invention.
Figure 2:
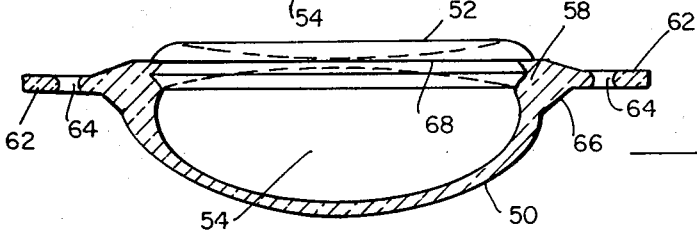
FIG. 2 is a sectional view of the lure of FIG. 1 with the lure lid snapped in place on the lure body.
Figure 3:
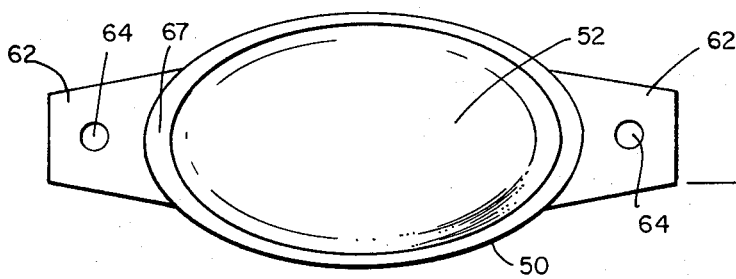
FIG. 3 is a top view of the assembled fishing lure of FIG. 1.

As shown in FIGS. 1–3, a pressure releasing self-illuminating fishing lure comprises a container having a body member 50 and a lid member 52 comprising an at least partially transparent material and defining an interior cavity 54. When the lid 52 is removed in the position shown in FIG. 1, a chemiluminescent material such as that disclosed in the aforesaid copending application Ser. No. 114,968 incorporated herein by reference may be introduced into the cavity 54 through an opening 56. Once the chemiluminescent material has been introduced, the cavity may be closed to form a liquid tight reaction chamber in the body 50 covered by the lid 52 by means of snap-action connecting means including a lip 58 of the body 50 and the rim 60 of the lid 52.

In order to permit the release of the gas build-up within the cavity 54 resulting from a chemiluminescent reaction, the lid 52 comprises a gas permeable material impervious to the chemiluminescent material located within the cavity 54. Thus as the reaction proceeds, the gas is able to diffuse through the lid 52 while the chemiluminescent material is retained within. The lid 52 may therefore comprise a soft gas permeable material such as polyethylene or polypropylene of suitable density.

In contrast, the body may comprise a harder plastic transparent material such as styrene acrylonitrile copolymers; polycarbonates, including the aromatic polycarbonates obtained from dihydric phenols (e.g., bisphenol-A) and phosgene; ionomeric polyethylene, such as sold commercially by the duPont Company under the trade designation "SURLYN;" polymerized allyl compounds such as allyl diglycol-2-carbonate, diallyl phlhalate, allyl chloroacrylate, and the like. The harder material in combination with the soft material of the lid 52 provides the snap action between the lid 52 and the body 50 as well as permitting the use of integral extensions 62 which extend from opposite ends of the body 50. These extensions must be fairly strong to permit the connection of appropriate fishing tackle or other containers by means of holes 64 in the ears 62. To provide additional strength, integral reinforcing areas 66 and 67 are also utilized. Preferably, at least one optical brightener such as 3,7 DITRIAZINYL AMINODIBENZOTHIOPHENE 2,8 DISULFONIC ACID, 5,5 DIOXIDE DISODIUM SALT is incorporated in the structural material as parts of the body or is applied as part of a coating material.

Note that the lid 52 is of variable thickness having a maximum thickness near the rim 60 and a minimum thickness at the center thereof. This variation in thickness provides two very important functions. First, the reduced thickness of the lid 52 at the center facilitates diffusion of the gases within the cavity 54 through the lid 52. Furthermore, the concave nature of the surface 68 on the interior side of the lid 52 assists in establishing a better seal between the lid 52 and the body 50 as pressure within the cavity 54 increases.

In this connection, note that the inclined surface 70 of the rim 60 snaps beneath the complementary inclined surface 72 of the lip 58. As the pressure within the cavity 54 increases, the forces applied against the surface 68 maintain good contact between the surfaces 70 and 72. Furthermore, the surfaces 70 and 72 in combination with adjacent surfaces 74 and 75 of the lid 52 and the body 50 respectively provide snap action between the lid 52 and the body 50. Thus the snap action connection between the lid 52 and the body 50 resists opening due to the internal pressure within the cavity 54 while still permitting the removal of the lid 52 by inserting a finger nail or other object under the edge 77 of the lid 52. The snug fit provided between the lid 52 and the body 50 retains the chemiluminescent material within the cavity 54 even upon shaking.

Although not shown, the previously described container may be utilized for fishing tackle of various kinds by appropriate connections made at the holes 64. For example, a hook may be attached at either hole 64. Furthermore, the container may be outfitted as a fly utilized as a trailing lure. It is also possible to connect a plurality of the containers together by means of the hole 64 to provide a lure having increased light emission.

Figure 4:
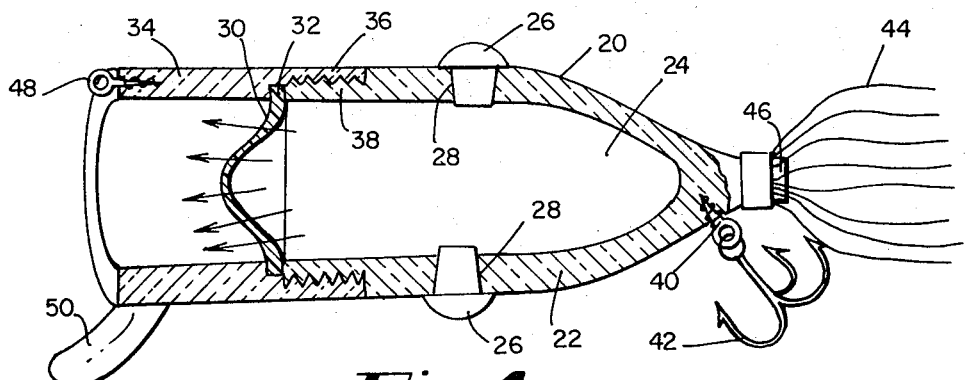
FIG. 4 is a sectional view of another embodiment of the invention in a fishing lure.

In FIG. 4, a pressure releasing self-illuminating fishing lure is shown. The lure comprises a container having a body portion 20 comprising at least partially transparent walls 22 which define an interior cavity 24. Small removable plugs 26 are provided at openings 28 in the walls 22 to permit the ingress and egress of a chemiluminescent material such as that disclosed in the previously mentioned application Ser. No. 114,968. When the plugs 26 are in place as shown, a liquid-tight seal is formed at the edge of the openings 28.

In order to permit the escape of gases generated by the chemiluminescent reaction within the cavity 24, a gas permeable means impervious to the chemiluminescent material is provided in communication with the cavity 24. The means comprises a membrane 30 which is retained in place along the periphery 32 by a threded tubular member 34 having a threaded portion 36 engaging the threaded portion 38 of the body 20. The periphery 32 is thickened so as to enhance the seal provided by the membrane 30.

Before the chemiluminescent reaction begins within the cavity 24, the membrane 30 is undistorted having the shape shown in phantom. However, once the reaction begins, the gas generated by the chemiluminescent reaction forces the member 30 outwardly to the position shown in full with the gas escaping from the cavity 24 and out the tubular member 34 as shown by the arrows.

The body 20 is provided with a screw eye 40 for attaching a three pronged hook 42. The feathery decorations 44 are secured to the end 46 providing a more effective fish attractant. The tubular member 34 is provided with an eyelet 48 for purposes of attaching a fishing line not shown. An integral molded fin 50 at the front of the tubular member 34 is provided as a hydrodynamic motion guide.

In order to permit the transmission of light from the cavity 24, the walls 22 must be at least partially transparent and may therefore comprise a clear acrylic or any other transparent plastic material of sufficient strength to resist pressure differentials associated with the use of the lure. The membrane 30 may comprise any material which will perform the sealing function by being gas permeable but impervious to the chemiluminescent material. A low density polythylene having a thickness of 1/16 to 1/32 of an inch at the center of the membrane is particularly suitable.

Figure 5:
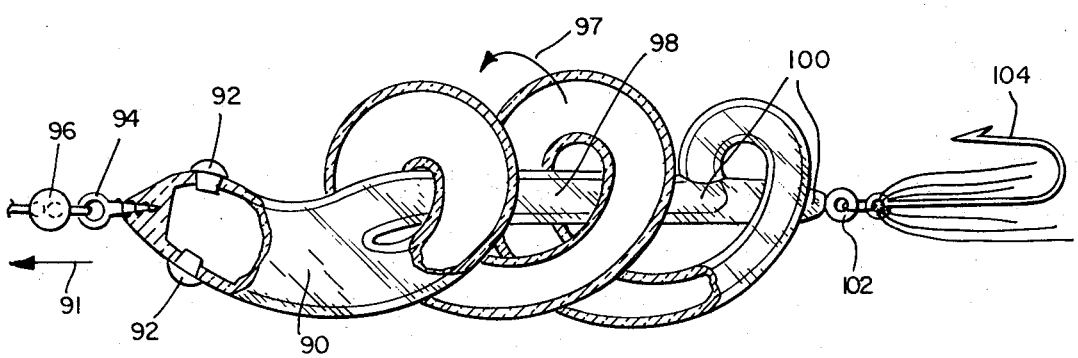
FIGS. 5 and 6 are sectional views of still other embodiments of the invention.

A self-illuminating helical tubular fishing lure is shown in FIG. 5. The main body of the helical vessel 390 is preferably equipped with one or two tightly fitting plugs 92 and a screw eyelet 94 for attachment to a rotating ball swivel 96 enabling a free rotation of the lure in the direction of the arrow 97. Upon trolling in water, the lure rotates and the chemiluminescent material is mixed or agitated in the vessel 90 in a direction opposite to the trolling direction 91. When the material arrives at the end of the helix, the mixture returns through a linear return tube 98 to begin the circulation through the helical part again. The end of the linear tube 100 is equipped with an eyelet 102 providing means for attachment of a hook 104. A continuous motion of the chemiluminescent material as provided by the rotating motion results in an improved mixing of the chemiluminescent components in the lure. As a result, light of improved intensity is emitted by the hydrodynamic rotary motion of the lure. A suitable material for the walls of the vessel 90 is polyethylene. This wall material is gas permeable yet impervious to the chemiluminescent material to permit the escape of gas from the vessel 90.

Figure 6:
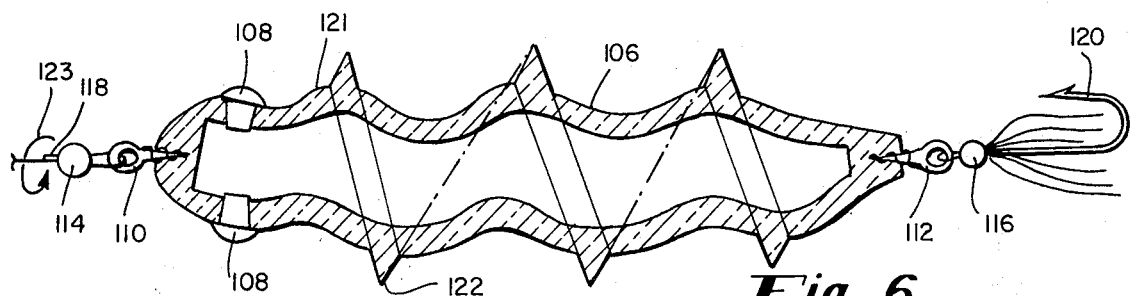
Figure 7:
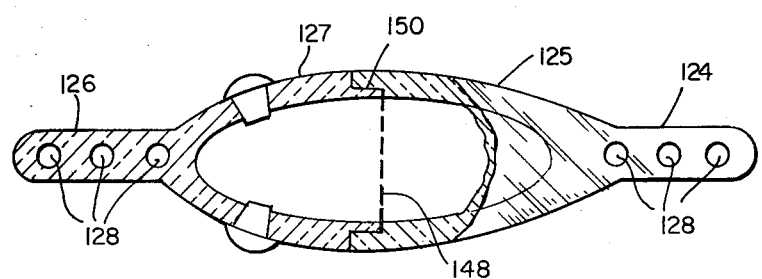
FIGS. 7–11 show another fishing lure embodiment adapted for use with other fishing tackle.

Another form of the helically stirred chemiluminescent lure is shown in FIG. 6. A longitudinally twisted transparent body 106 of the lure is equipped with sealing plugs 108 and screw eyelets 110 and 112 to accommodate all swivel connections 114 and 116 for a line 118 and a hook 120. The body 106 which comprises a gas permeable material impervious to the chemiluminescent material is provided with elevated ridges 121 with continuously running baffels or trailing edges 122. When the helical chemiluminescent lure is trolled in water, the baffels cause the lure to rotate as shown by the curved arrow 123, thereby continuously mixing the contents of the lure, and causing intense light emission which is accompanied by the rotating motion of the light emitting chemiluminescent mixture in the lure. Again, a suitable material for the body 106 is polyethylene.

Figures 8, 9:
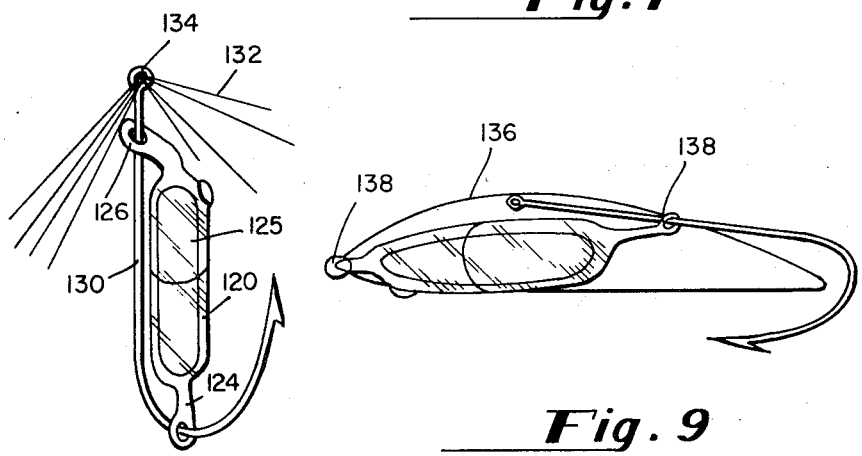
Figure 10:
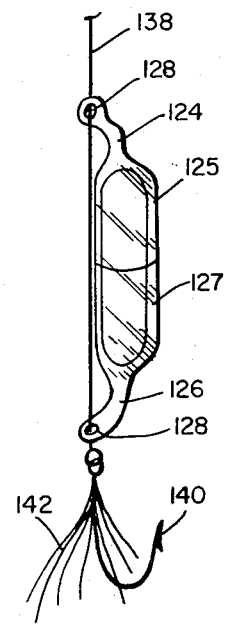
Figure 11:
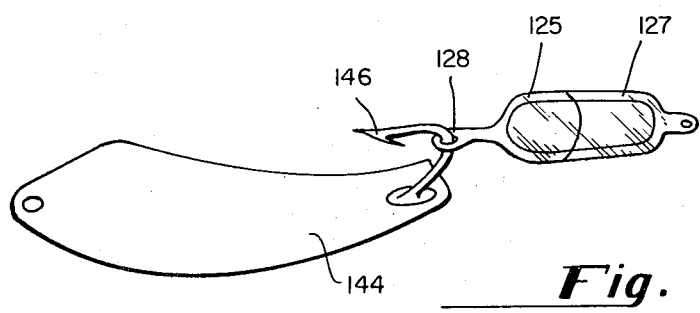

A universally adaptable self-illuminating lure container is shown in FIG. 7–11. The container comprises body members 125 and 127 having integral strips 124 and 126 extending from the ends thereof. Apertures 128 of various sizes are provided in the strips 124 and 126 and permit the attachment of the container to all kinds of fishing tackle. For example, FIG. 8 shows the container with the hook passing through apertures 128 in the members 124 and 126. The hook itself may include whiskers 132 attached at an eye 134. In FIG. 9, the container is secured to a spoon-type lure 136 by suitable fasteners 138 passing through the holes 128 of the lure 136. The container is supported by a line 138 in FIG. 10 with the line passing through the apertures 128 in both strips 124 and 126. The line terminates in a hook 140 having whiskers 142. In FIG. 11, the container is attached to and trailing a spoon lure 144 by inserting the hook 146 through one of the openings 128.

At least one of the body members 125 and 127 comprises a gas permeable material impervious to the chemiluminescent material which may be introduced into a cavity 148 of the container. A press fit between the body members 125 and 127 at services 150 provides an adequate seal for preventing the escape of chemiluminescent material between the body members. Of course, the diffusion of gas through one or both of the body members reduces the pressure build up within the cavity 148 thereby preventing the separation between the body members 120 and 122.

Certain components of a fishing lure kit are shown in FIG. 12. It includes different rear body members 152, 154, and 156, all of which include standardized threaded portions 158. Similarly, it includes three different front body members 160, 162, and 164, all of which include three standardized threaded portions 166. Three different membranes 168, 170 and 172 which are also provided are interchangable to seal off the cavity. In other words, the front body member 162, the membrane 170, and the rear body member 154 may be assembled to form a fishing lure or the membrane 168 may be utilized in that combination in stead. Or, the membrane 172 may be utilized between any rear body member and any front body member to seal off the cavity. The kit further includes a water resistant water floatable, squeeze-type container 173 for introducing a chemiluminescent material in an unctuous form into the interior or cavity of the container body. As shown, the unctuous material may be squeezed directly onto the membrane 172 or any other membrane before closing. In the alternative, the chemiluminescent materials in other forms may be introduced into the cavity defined by the body members 164 and 156 through openings in the body member 156 which are then closed off by plugs 175 after chemiluminescent activating material such as water is also introduced into the cavity through the openings.

Substantially, all plastic lures are shown in FIGS. 13–16. In FIG. 13, a lid 200 is hinged from a container body 202 by inserting the T-shaped element 204 through openings 206 in the hinge arm 208. The integral plastic hook 210 extends from the opposite end of the lid 200. The lure of FIG. 15 is substantially identical and shows the assembled hinge. A feathered or plastic skirt 211 extends from a tab 212.

FIG. 14 shows a pair of lures substantially identical to the lure of FIG. 13 having disruptable links 214. These permit the lures to be used in tandem or to be purchased in a string and separated from the string as needed. The lure of FIG. 15 is similar except for a weed guard 216 which extends from the tab 212 to a point adjacent to the barb of the hook 218. The hook bearing lids 200 in FIGS. 13–16 must be relatively hard and preferably comprise a transparent material, the body members must comprise a soft gas permeable member which is impervious to the chemiluminescent material introduced into the cavity defined by the lids 200 and the bodies 202. A suitable material for the bodies 202 is polyethylene.

Although the specific embodiements of the invention have been disclosed, it will be appreciated by those of ordinary skill in the art that various changes and modifications may be made which fall within the scope of the invention as set forth in the appended claims.

What is claimed is:

1. A fish lure adapted for use in combination with a light-generating chemiluminescent material, comprising a lure shaped container having an interior cavity forming a reaction chamber for said material, at least a portion of said container transmitting light generated by a reaction of said material when present within said cavity, said container including a wall portion of uniformly porous material and being gas permeable and being impervious to said chemiluminescent material to permit the escape of gases from said container while retaining the chemiluminescent material within said cavity.

2. The fish lure of claim 1 wherein said lure shaped container comprises a body having an opening communicating with said cavity and a removable closure member forming a seal at the edge of said opening, said opening permitting the refilling of said cavity with said material.

3. The fish lure of claim 2 wherein said wall portion comprises a membrane forming a seal with said body to prevent the escape of said chemiluminescent material.

4. The fish lure of claim 3 wherein said body comprises two mating body members, said membrane being clamped between said body members to form said seal between said body members.

5. The fish lure of claim 1 wherein said wall portion comprises one body member and said container further comprises another body member cooperating with said one body member to form said interior cavity, said body members including cooperating snap-type connecting means which maintain said body members in mutual sealing engagement.

6. The fish lure of claim 5 wherein said one body member comprises a lid characterized by a variable thickness so as to facilitate the diffusion of the gas through said lid at the thinner portions thereof.

7. The fish lure of claim 6 wherein said lid is thicker adjacent the edges than at the center thereof so as to form a generally concave surface partially defining said cavity.

8. The fish lure of claim 7 wherein said lid comprises a softer material than said other body member thereby assuring a tight fit between said lid and said other body member and a pollution-free seal therebetween.

9. The fish lure of claim 8 wherein said other body member has an inclined surface and said lid comprising an edge having a complementary inclined surface, said lid surface snapping into place beneath said body surface to provide a snap-type closing mechanism which resists opening by internal pressure within said cavity.

10. The fish lure of claim 5 wherein said other body member includes extensions extending therefrom having apertures therein for connecting other fishing tackle to said container or a plurality of containers to one another.

11. The fish lure of claim 1 wherein said lure comprises a container body and a lid, said body and said lid including mutually cooperating hinge means for securing said lid to said body member.

12. The fish lure of claim 1 wherein said container comprises at least one strip of material having at least two holes therein for attachment to conventional fishing tackle.

13. The fish lure of claim 1 wherein said container includes hydrodynamic means for rotating said container upon trolling to facilitate mixing of the container contents.

14. A fishing tackle kit comprising:
a light-generating chemiluminescent material;
a lure shaped container having walls defining a refillable cavity having a reaction chamber adapted to contain said light-generating material, said walls at least in part formed of a light-transmitting material for transmitting light generated from said chemiluminescent material when reacting in said chamber, said container including a wall portion of uniformly porous material and being gas permeable and being impervious to said chemiluminescent material cooperating with said cavity for retaining said chemiluminescent material within said chamber while permitting gas to flow through said wall portion.

15. The kit of claim 14 including a plurality of containers comprising interchangeable body members, forming refillable cavities and providing a number of different lures by utilizing different combinations of said body members.

16. The kit of claim 15 comprising a squeeze-type, water resistant, and water floatable container for said chemiluminescent material for storing said material before filling said chamber.

17. The kit of claim 16 comprising more than one said wall portion impervious to said chemiluminescent material, said wall portions comprising membranes interchangably cooperating with each cavity of said bodies.

18. The kit of claim 17 further comprising an optical brightener associated with the walls of each container.

* * * * *